(12) United States Patent
Jerwick et al.

(10) Patent No.: US 10,011,282 B2
(45) Date of Patent: Jul. 3, 2018

(54) PRIME MOVER ARRANGEMENT AND METHOD FOR CONTROLLING SPEED AND TORQUE OUTPUT OF A PRIME MOVER ARRANGEMENT

(71) Applicant: VOLVO TRUCK CORPORATION, Göteborg (SE)

(72) Inventors: John Jerwick, Hagerstown, MD (US); Brian Gordon, Shady Grove, PA (US); Todd Werner, Hedgesville, WV (US)

(73) Assignee: Volvo Truck Corporation, Göteborg (SE)

( * ) Notice: Subject to any disclaimer, the term of this patent is extended or adjusted under 35 U.S.C. 154(b) by 14 days.

(21) Appl. No.: 15/038,703

(22) PCT Filed: Dec. 20, 2013

(86) PCT No.: PCT/IB2013/003223
§ 371 (c)(1),
(2) Date: May 23, 2016

(87) PCT Pub. No.: WO2015/092477
PCT Pub. Date: Jun. 25, 2015

(65) Prior Publication Data
US 2016/0347316 A1    Dec. 1, 2016

(51) Int. Cl.
*B60L 9/00* (2006.01)
*B60W 30/188* (2012.01)
(Continued)

(52) U.S. Cl.
CPC .......... *B60W 30/188* (2013.01); *B60K 6/105* (2013.01); *B60K 17/08* (2013.01); *B60W 10/04* (2013.01); *B60W 10/06* (2013.01); *B60W 10/08* (2013.01); *B60W 10/10* (2013.01); *B60W 10/101* (2013.01); *B60W 20/10* (2013.01);
(Continued)

(58) Field of Classification Search
USPC .......................................................... 701/22
See application file for complete search history.

(56) References Cited

U.S. PATENT DOCUMENTS 2,844,973 A * 7/1958 Claude ............... B60K 17/3467
                                                        192/96
4,346,624 A   8/1982 Nagasaki et al.
(Continued)

FOREIGN PATENT DOCUMENTS

EP        0108551 A1    5/1984

OTHER PUBLICATIONS

International Search Report (dated Oct. 20, 2014) for corresponding International App. PCT/IB2013/003223.
(Continued)

*Primary Examiner* — Tyler Paige
(74) *Attorney, Agent, or Firm* — WRB-IP LLP

(57) ABSTRACT

A prime mover arrangement includes a prime mover (23) including a first shaft (25) driven by the prime mover, a second shaft (27), and a speed and torque manipulator (29) connected to the first shaft (25) and to the second shaft (27), the speed and torque manipulator permitting manipulation between at least one non-one-to-one ratio or a plurality of different input/output ratios of speeds and torques input by the first shaft and output to the second shaft. A method is also disclosed.

39 Claims, 5 Drawing Sheets

(51) Int. Cl.
*B60K 6/10* (2006.01)
*B60W 10/04* (2006.01)
*B60W 10/06* (2006.01)
*B60W 10/10* (2012.01)
*B60W 20/10* (2016.01)
*B60K 17/08* (2006.01)
*B60W 10/08* (2006.01)
*B60W 10/101* (2012.01)

(52) U.S. Cl.
CPC ...... *B60W 30/1882* (2013.01); *B60Y 2300/52* (2013.01); *Y02T 10/56* (2013.01); *Y02T 10/6204* (2013.01); *Y02T 10/84* (2013.01)

(56) References Cited

U.S. PATENT DOCUMENTS

| | | | | |
|---|---|---|---|---|
| 7,293,543 | B1 | 11/2007 | Scekic | |
| 8,649,950 | B2* | 2/2014 | Yang | B60K 17/08 475/1 |
| 2002/0023607 | A1* | 2/2002 | Poehlman | F02N 5/02 123/185.14 |
| 2006/0079368 | A1* | 4/2006 | Hemphill | F16H 3/006 475/214 |
| 2006/0169503 | A1* | 8/2006 | Oliver | B60K 6/365 180/65.25 |
| 2007/0199397 | A1* | 8/2007 | Maten | F16H 61/688 74/340 |
| 2009/0240415 | A1* | 9/2009 | Sukaria | B60T 8/172 701/84 |
| 2010/0021331 | A1* | 1/2010 | Hruschka | F01C 1/20 418/136 |
| 2010/0120565 | A1 | 5/2010 | Kochidomari et al. | |
| 2010/0331141 | A1 | 12/2010 | Dobele et al. | |
| 2011/0238243 | A1* | 9/2011 | Yang | B60K 6/442 701/22 |
| 2012/0016561 | A1* | 1/2012 | Pinte | F16D 48/066 701/68 |
| 2012/0178567 | A1* | 7/2012 | Schoenek | F16H 3/66 475/5 |
| 2013/0172140 | A1* | 7/2013 | Potter | B60K 6/54 475/5 |
| 2015/0059522 | A1* | 3/2015 | Hughes | F16H 45/00 74/655 |
| 2016/0053863 | A1* | 2/2016 | Glover | B60K 6/485 74/664 |
| 2016/0347316 | A1* | 12/2016 | Jerwick | B60K 6/105 |

OTHER PUBLICATIONS

International Preliminary Report on Patentability (dated Feb. 3, 2016) for corresponding International App. PCT/IB2013/003223.

* cited by examiner

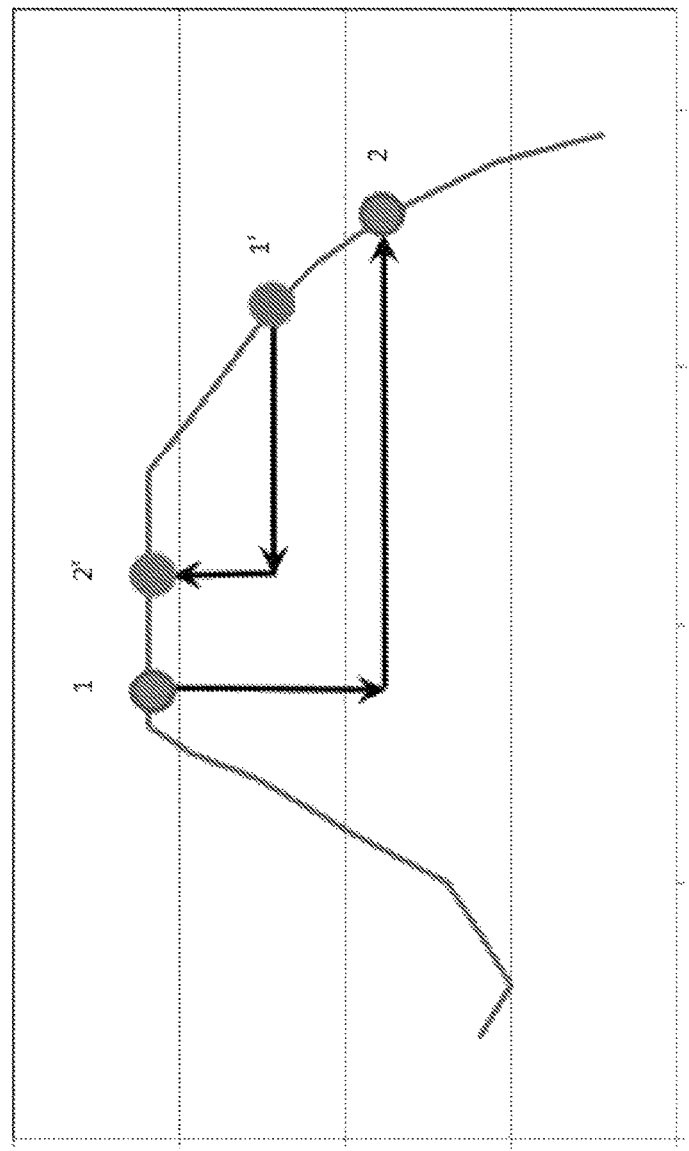

PRIME MOVER ARRANGEMENT AND METHOD FOR CONTROLLING SPEED AND TORQUE OUTPUT OF A PRIME MOVER ARRANGEMENT

BACKGROUND AND SUMMARY

The present invention relates generally to prime movers and, more particularly, to prime movers of the type that are called upon to provide different levels of power and must deliver power at different shaft speeds and torques.

When supplying power from a prime mover such as an internal combustion engine to, e.g., a transmission, it is often necessary to change the speed or torque supplied to a flywheel. The engine may initially be operated at a particular speed and torque combination that results in, e.g., optimal fuel consumption levels for the load demanded. However, changing the speed or torque demanded at the flywheel may result in it being necessary to operate the engine conditions that are less than optimal in terms of fuel consumption. It is desirable to reduce the complexity of changing engine speed and torque to the driveline in some manner that avoids the need to change engine crankshaft speeds to the ranges used by clutches, transmissions, drive shafts, and axles.

Heavy duty engine design is moving toward lowering engine speed operating ranges to improve fuel economy in vehicles. This trend creates a need for new clutch, transmission, driveshaft, and axle designs to handle the higher mean operating torques. Moreover, in general, different drivetrain designs must often be provided whenever different operating torques are used. This makes it difficult to standardize drivetrain design. It is desirable to facilitate use of a variety of prime movers of different operating torques in a common or more standardized drivetrain design.

In accordance with an aspect of the present invention, a prime mover arrangement comprises a prime mover including a first shaft driven by the prime mover, a second shaft, the first and second shafts being non-coaxial, and a speed and torque manipulator connected to the first shaft and to the second shaft, the speed and torque manipulator permitting manipulation of at least one non-one-to-one ratio allowing speed and torque of the second shaft to be different than that of the prime mover.

In accordance with another aspect of the present invention, a method is provided for controlling speed and torque output of a prime mover arrangement, the prime mover arrangement comprising a prime mover and a speed and torque manipulator, the method comprising operating the prime mover so that a first shaft is driven by the prime mover at a first speed and at a first torque, driving the speed and torque manipulator via the first shaft, driving a second shaft via the speed and torque manipulator at a first output speed and first output torque at a first non-one-to-one ratio relative to the first speed and the first torque, the second shaft being non-coaxial with the first shaft.

In accordance with another aspect of the present invention, a non-transitory computer program product comprising computer code for controlling speed and torque output of a prime mover arrangement is provided, the prime mover arrangement comprising a prime mover and a speed and torque manipulator, to perform a method comprising operating the prime mover so that a first shaft is driven by the prime mover at a first speed and at a first torque, driving a speed and torque manipulator via the first shaft, driving a second shaft via the speed and torque manipulator at a first output speed and first output torque at a first ratio relative to the first speed and the first torque, the second shaft being non-coaxial with the first shaft, driving the second shaft via the speed and torque manipulator at a second output speed and second output torque at a second ratio relative to the first speed and the first torque, and driving the second shaft via the speed and torque manipulator at a third output speed and third output torque at a third ratio relative to the first speed and the first torque.

According to an aspect of the present invention, a prime mover arrangement comprises a prime mover including a first shaft driven by the prime mover, a second shaft, and a speed and torque manipulator connected to the first shaft and to the second shaft, the speed and torque manipulator permitting manipulation between at least three different input/output ratios of speeds and torques input by the first shaft and output to the second shaft.

According to another aspect of the present invention, a method for controlling speed and torque output of a prime mover arrangement is provided, the prime mover arrangement comprising a prime mover and a speed and torque manipulator. The method comprises operating the prime mover so that a first shaft is driven by the prime mover at a first speed and at a first torque, driving a speed and torque manipulator via the first shaft, driving a second shaft via the speed and torque manipulator at a first output speed and first output torque at a first ratio relative to the first speed and the first torque, driving the second shaft via the speed and torque manipulator at a second output speed and second output torque at a second ratio relative to the first speed and the first torque, and driving the second shaft via the speed and torque manipulator at a third output speed and third output torque at a third ratio relative to the first speed and the first torque.

According to yet another aspect of the present invention, a non-transitory computer program product comprising computer code for controlling speed and torque output of a prime mover arrangement is provided, the prime mover arrangement comprising a prime mover and a speed and torque manipulator, to perform a method comprising operating the prime mover so that a first shaft is driven by the prime mover at a first speed and at a first torque, driving a speed and torque manipulator via the first shaft, driving a second shaft via the speed and torque manipulator at a first output speed and first output torque at a first ratio relative to the first speed and the first torque, driving the second shaft via the speed and torque manipulator at a second output speed and second output torque at a second ratio relative to the first speed and the first torque, and driving the second shaft via the speed and torque manipulator at a third output speed and third output torque at a third ratio relative to the first speed and the first torque.

In accordance with another aspect of the present invention, a generator arrangement comprises a generator including a first shaft arranged to drive the generator, a second shaft adapted to be driven, and a speed and torque manipulator connected to the first shaft and to the second shaft, the speed and torque manipulator permitting manipulation between a plurality of different input/output ratios of speeds and torques input by the second shaft and output to the first shaft.

In accordance with another aspect of the invention, a method for controlling speed and torque output of a generator arrangement is provided, the generator arrangement comprising a generator connected to a speed and torque manipulator via a first shaft, and a second shaft that is adapted to be driven to input power to the speed and torque manipulator. The method comprises driving the second shaft at a first speed and at a first torque, driving the speed and torque manipulator via the second shaft, driving the first shaft and the generator via the speed and torque manipulator at a first output speed and first output torque at a first ratio relative to the first speed and the first torque, and driving the first shaft and the generator via the speed and torque manipulator at a second output speed and second output torque at a second ratio relative to the first speed and the first torque.

In accordance with yet another aspect of the invention, a non-transitory computer program product is provided and comprises computer code for controlling speed and torque output of a generator arrangement according to a method, the generator arrangement comprising a generator connected to a speed and torque manipulator via a first shaft, and a second shaft that is adapted to be driven to input power to the speed and torque manipulator. The method comprises registering that the second shaft is being driven at a first speed and at a first torque, driving the speed and torque manipulator via the second shaft, driving the first shaft and the generator via the speed and torque manipulator at a first output speed and first output torque at a first ratio relative to the first speed and the first torque, and driving the first shaft and the generator via the speed and torque manipulator at a second output speed and second output torque at a second ratio relative to the first speed and the first torque.

BRIEF DESCRIPTION OF THE DRAWINGS

The features and advantages of the present invention are well understood by reading the following detailed description in conjunction with the drawings in which like numerals indicate similar elements and in which:

FIG. 5 is a graph of torque versus speed for a manipulator permitting a single non-one-to-one input/output ratio.

DETAILED DESCRIPTION

Figure 1A:
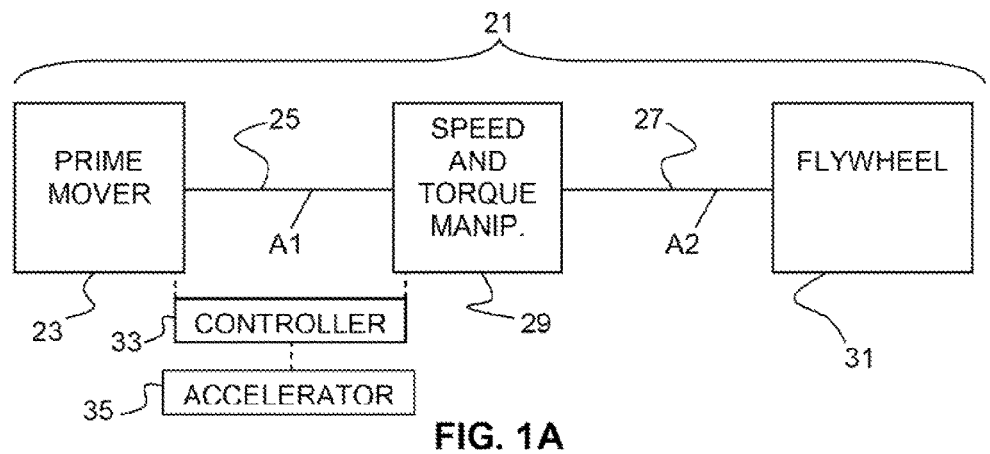
FIGS. 1A-1C show embodiments of prime mover arrangements according to aspects of the present invention.
Figure 1B:
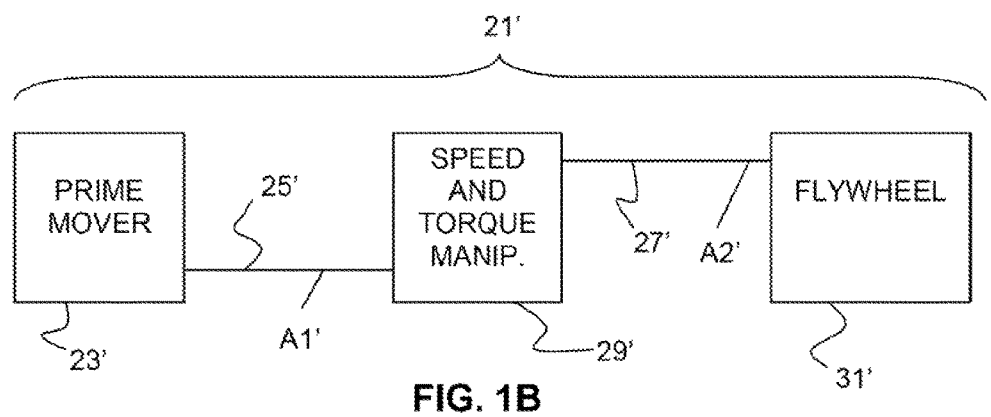
Figure 1C:
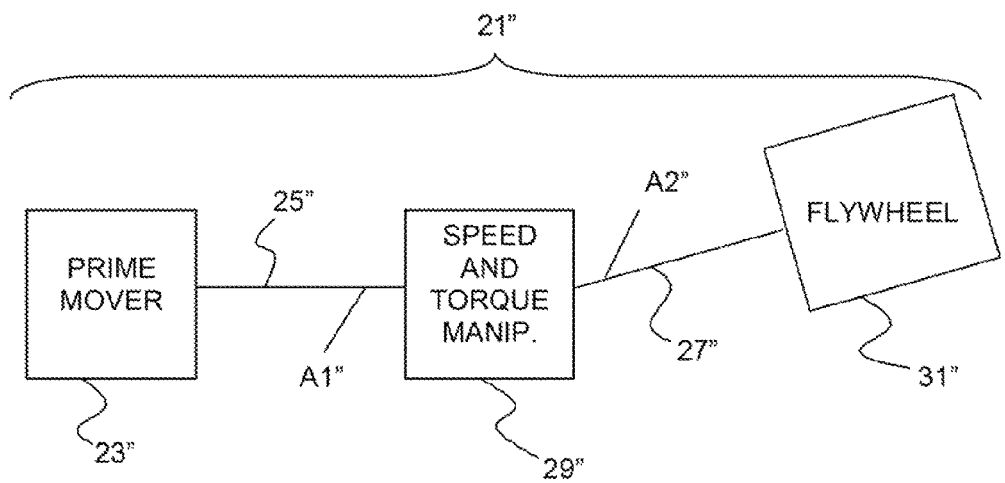

FIGS. 1A-1C show prime mover arrangements 21, 21', and 2" according to aspects of the present invention. Referring, for purposes of discussion, to the prime mover arrangement 21 shown in FIG. 1A, the prime mover arrangement 21 comprises a prime mover 23 including a first shaft 25 driven by the prime mover, a second shaft 27, and a speed and torque manipulator 29 connected to the first shaft and to the second shaft. The speed and torque manipulator 29 permits manipulation of at least one ratio that is not 1:1 ("non-one-to-one") or between a plurality, i.e., at least two, more preferably at least three, and still more preferably, an infinite number of different input/output ratios of speeds and torques input by the first shaft 25 and output to the second shaft 27. In a vehicle application, the prime mover arrangement 21 is typically connected upstream of other components of a drive train such as a flywheel 31 and a transmission (not shown), or a power take-off for a loading arm or other structure. The prime mover arrangement and method described herein is not limited to vehicle applications, however. Moreover, it will be appreciated, however, that the prime mover need not be "upstream" in all circumstances, such as when the prime mover is a motor/generator functioning as a generator (including for electrical generation in vehicles and elsewhere, such as wind and other types of turbines), being used for power recovery from a power take-off device, or in an engine-brake mode. What is meant by manipulation of one non-one-to-one ratio is that the input from the engine (e.g., torque and speed 1 or 1') to the manipulator 29 is different from the output to the drivetrain (e.g., torque and speed 2 or 2') from the manipulator, as illustrated in FIG. 5. The input/output is manipulated in the sense that there is not a 1:1 ratio as would be conventional in the absence of a manipulator 29.

While the speed and torque manipulator 29 may permit manipulation to at least one non-one-to-one input/output ratio, manipulation may be between two or more specific different input/output ratios of speeds and torques input by the first shaft 25 and output to the second shaft 27, it is possible and, typically preferred that the speed and torque manipulator permit manipulation between an infinite number of input/output ratios of speeds and torques input from the first shaft and output to the second shaft ranging between a minimum ratio and a maximum ratio. Whether the speed and torque manipulator 29 is able to provide particular specific ratios only or is able to provide an infinite number of ratios will typically depend upon factors including user preference and design constraints, as will what specific ratios are permitted, or what maximum and minimum ratios are available.

The prime mover 23 can be any suitable form of prime mover such as an internal combustion engine, an electric motor, a steam engine, and the like. It is presently contemplated that the prime mover arrangement 21 will be particularly useful in internal combustion engine applications where the first shaft 25 may form part of or be connected directly to the crankshaft of the engine.

In a typical internal combustion engine, the crankshaft is connected directly to a flywheel with the axes of rotation of the crankshaft and the flywheel being aligned. FIG. 1A shows a prime mover arrangement 21 wherein the first shaft 25 may be a crankshaft of a prime mover 23 in the form of an internal combustion engine, and an axis A2 of the second shaft 27 and a flywheel 31 is axially aligned with an axis A1 of the first shaft. The flywheel 31 will typically be provided as part of a prime mover arrangement 21, however, it need not be. However, as seen by FIGS. 1B and 1C, by providing the speed and torque manipulator 29' or 29" between the first shaft 25' or 25" and the second shaft 27' or 27", with a flywheel 31 driven by the second shaft, different configurations are facilitated, permitting substantial design flexibility. For example, as shown in FIG. 1B, longitudinal axes A1' and A2' of the first shaft 25' and the second shaft 27' are parallel to but axially offset from each other. As shown in FIG. 1C, longitudinal axes A1" and A2" of the first shaft 25" and the second shaft 27" are non-parallel to each other.

The speed and torque manipulator 29 comprises any suitable means for changing a speed ratio between the first shaft 25 and the second shaft 27, ordinarily one or more of a continuously variable transmission, a gear train, and a chain drive. When the speed and torque manipulator 29 comprises a continuously variable transmission, it will ordinarily include one or more of a fluid coupling, a belt and pulley arrangement (e.g., with one or more conical pulleys), and a rolling traction continuously variable transmission. When the speed and torque manipulator 29 comprises a gear train, it will typically comprise one or more of a single gear train, a layshaft gear train, and a planetary gear train. When the speed and torque manipulator 29 comprises a chain drive, it will typically comprise one or more of a multiple sprocket chain drive, and an expandable sprocket chain drive.

The prime mover arrangement 21 typically comprises a controller 33 (FIG. 1A) configured to control the speed and torque manipulator 29 to select an input/output ratio as a function of a power demand. The controller 33 is any suitable device such as an ECU. The power demand may be set or changed by any suitable means such as by, for example, depression or release of an accelerator pedal 35 (FIG. 1) in a vehicle cab. The controller 33 will typically be configured to control the prime mover 23 as a function of the power demand, as well. The controller 33 will typically be configured to control the speed and torque manipulator 29 to select an input/output ratio as a function of the power demand to optimize fuel consumption.

A presently preferred application for the prime mover arrangement 21 will optimize fuel consumption for a particular drivetrain design, however, it will be appreciated that the prime mover arrangement can be designed to optimize other performance or emissions characteristics, as well as engine braking operation, power take-off operation, vibrations, and powertrain weight. Moreover, the drivetrain may be specially designed for a particular purpose other than vehicle propulsion, such as engine braking, power take-off. Inputs to the controller 33 would be different depending upon the characteristic(s) that is (are) sought to be optimized, or the purpose of the drivetrain. For example, in a system that is intended for use with a power take-off, it may be desirable to optimize the system to facilitate adjustments of speed and torque applied during a first working mode to adjust speed and torque applied to a structure such as a bucket loader or a backhoe during a lifting operation and, during a second working mode, to recover energy as the bucket loader or backhoe is lowered by operating the prime mover arrangement 21 in reverse. Similarly, the design and control of the prime mover arrangement 21 may differ if the intended function of the device is to function as a generator versus where the device is intended to deliver force to a vehicle's wheels. For purposes of description of the invention, however, the prime mover arrangement 21 will primarily be described in connection with its application in connection with supplying force to a vehicle's wheels, except where otherwise noted.

A method for controlling speed and torque output of a prime mover arrangement 21 shall be described with reference to the structures shown in FIG. 1A, except where otherwise indicated, the flow chart shown in FIG. 2, and the graph shown in FIG. 3. In the method, as seen at step 100 of FIG. 2, a power demand for a first power is input, such as by depressing an accelerator pedal 35. As seen at step 105, the prime mover 23 is operated so that the first shaft 25 is driven by the prime mover at a first speed S1 and at a first torque T1 (FIG. 3) to provide the first power output.

Figure 3:
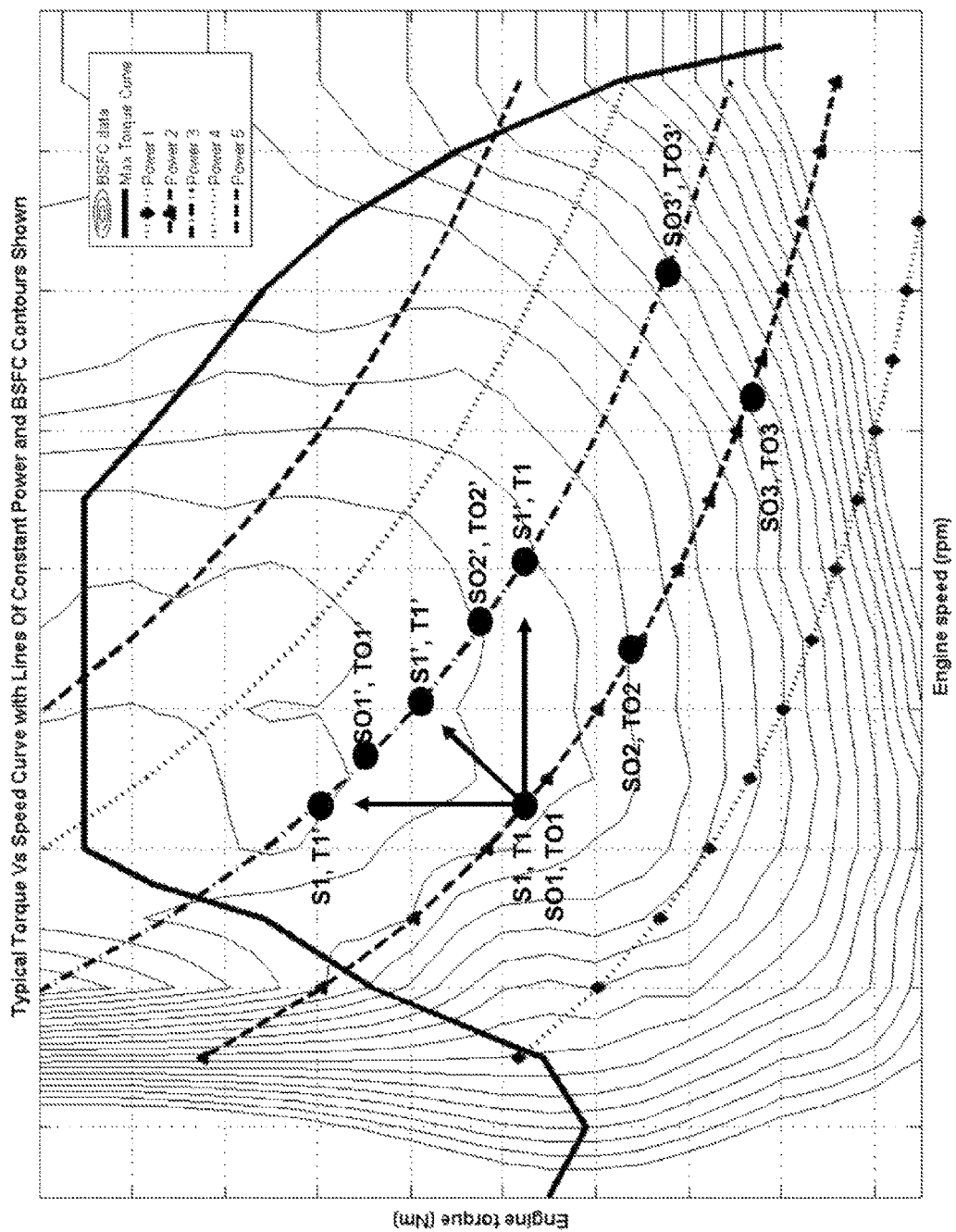
FIG. 3 is a graph of engine speed and torque for an illustrative internal combustion engine including a map of Brake Specific Fuel Consumption for the engine.

FIG. 3 is a graph of engine torque versus engine speed for an illustrative prime mover arrangement, and includes a map of Brake Specific Fuel Consumption (BSFC) for an illustrative prime mover such as an internal combustion engine, along with five illustrative lines of constant power for different levels of power (Power 1, ..., Power 5) that can be supplied from the prime mover arrangement, and a line of maximum torque for the prime mover. It will be appreciated that, for different types of internal combustion engines, the graph and map will appear quite different as it would for different types of prime movers. As seen at step 110, the prime mover 23 is typically further operated so that the first shaft 25 is driven by the prime mover at a first speed S1 and at a first torque T1 (FIG. 3) to provide the first power output at levels that are closest toward the centermost BFSC contour. The speed and torque manipulator 29 is driven via the first shaft 25. The speed and torque manipulator 29 is driven via the first shaft 25.

At step 115, the second shaft 27 is driven via the speed and torque manipulator at a first output speed SO1 and first output torque TO1 at a first ratio relative to the first speed S1 and the first torque T1 as the result of manipulation, by the speed and torque manipulator, of the first speed and first torque input to the speed and torque manipulator. Both or either of the first output speed and the first output torque may be the same as or, more typically, different from the first speed and the first torque. In FIG. 3, S1 and T1 are both illustrated as being the same as SO1 and TO1.

Also at step 115, the second shaft 27 may be driven via the speed and torque manipulator 29 at a second output speed SO2 and second output torque TO2 at a second ratio relative to the first speed S1 and the first torque T1, different from the first ratio, and the second shaft may further be driven via the speed and torque manipulator at a third output speed SO3 and third output torque TO3 at a third ratio relative to the first speed and the first torque, different from the first and second ratios. It will be seen that the speed and torque manipulator 29 can permit changing between at least the first and second ratios and thereby provides a plurality of different output speeds and torques through the second shaft 27 without changing the speed S1 and torque T1 input to the speed and torque manipulator through the first shaft 25 from the prime mover 23 at all. Thus, if the prime mover 23 is operated to provide a first speed and torque S1, T1 so that fuel consumption is optimized, it is still possible to provide a variety of different output speeds and torques at the same power output without altering the first speed and torque provided by the prime mover. In the past, to change speed output by a prime mover without a speed and torque manipulator, it would have been necessary to change the first speed and torque provided by the prime mover to the first shaft at levels that might have provide less than optimal fuel consumption, such as by changing S1, T1 to equal SO3, TO3, respectively, where SO3, TO3 falls well outside of the centermost contour of the BFSC map.

As seen in FIG. 3, if the prime mover 23 drives the first shaft at the first speed and torque S1, T1 to provide a first level of power (Power 2 in FIG. 3), the first output speed and torque SO1, TO1 may be the same speed and torque as the first speed and torque, i.e., lie at the same points along the line of constant power Power 2 shown in FIG. 3. Of course, SO1 and TO1 may be different from S1 and T1, also.

It will be appreciated that it is presently believed to ordinarily be preferable that the speed and torque manipulator 29 be adapted to change a ratio of the first speed and first torque S1, T2 of the first shaft input 25 to the speed and torque manipulator to an output speed and output torque (SO1, TO1, . . . SO∞, TO∞) of the second shaft 27 driven by the speed and torque manipulator at an infinite number of ratios between a maximum ratio and a minimum ratio, which will permit driving the second shaft at an output speed and output torque at any ratio, relative to the first speed and first torque, between the maximum ratio and the minimum ratio via the speed and torque manipulator at step 115. In embodiments permitting infinite adjustment between maximum and minimum ratios, when a power demand is input to the controller 33, one or more control signals may be output to the speed and torque manipulator to select a ratio between the maximum ratio and the minimum ratio as a function of the power demand. The ratio may be selected so that the prime mover 23 can be operated to provide a speed and torque S1, T1 at the first shaft 25 so that the desired power output is supplied while fuel consumption of the prime mover is optimized, while speed and torque output by the speed and torque manipulator 29 are at different levels that might be outside of the speeds and torques that provide for optimal fuel consumption if supplied directly by the prime mover.

Given a particular power demand, if the prime mover 23 is operated to provide a speed and torque at the first shaft 25 that can provide the demanded power at an optimal fuel consumption rate, if it is necessary to output a different speed and/or torque to the second shaft 27, a signal is sent to the speed and torque manipulator 29 to control the output speed so that the same power output can be provided while still optimizing fuel consumption as seen at step 120.

If a second, i.e., different power demand is input through the accelerator 35 at step 125, if the prime mover 23 is not currently operated to output a speed and torque to the first shaft 25 capable of supplying the demanded power, the controller 35 can output one or more control signals to control the prime mover as a function of the power demand so that the prime mover can provide the different power. For example, as seen in FIG. 3, if there is a demand to increase power from Power 2 to Power 3, the speed and torque supplied by the engine can be increased in any manner that will result the new power being supplied, such as by increasing speed to S1' while leaving torque at T1 (step 130b in FIG. 2, horizontal arrow in FIG. 3), increasing torque to T1' while leaving speed at S1 (step 130c in FIG. 2, vertical arrow in FIG. 3), or increasing both speed and torque to new levels S1', T1' (step 130a in FIG. 2, diagonal arrow in FIG. 3). Because any of the variations listed may be preferred for a particular set of circumstances, FIG. 2 shows steps 130a, 130b, and 130c in phantom. Ordinarily, it will be desirable to adjust the speed and torque of the prime mover 23 in a manner that will optimize fuel consumption as at step 135 in FIG. 2 which, in the system shown in FIG. 3, might involve leaving engine speed at speed S1 while increasing the torque output from the engine to T1' so that S1, T1' falls closest to a centermost contour of the BFSC map. Under other circumstances, of course, it might be desirable to change only speed or to change both speed and torque output to the first shaft 25.

The speed output of the engine can be kept the same while changing the torque output, and the torque output can be kept the same while varying the speed, via use of, e.g., an infinitely variable speed and torque manipulator 29 and/or by adjusting power output of the prime mover 23, such as by adjusting fueling of an engine. Output speed can be increased or decreased, for example, by altering the input/output ratio of the speed and torque manipulator 29 and/or by altering the fueling of the engine to cause the engine to rotated faster. Output torque can be increased or decreased, for example, by altering the input/output ratio of the speed and torque manipulator 29 and/or by altering the fueling of the engine while the engine rotates at the same speed.

Figure 2:
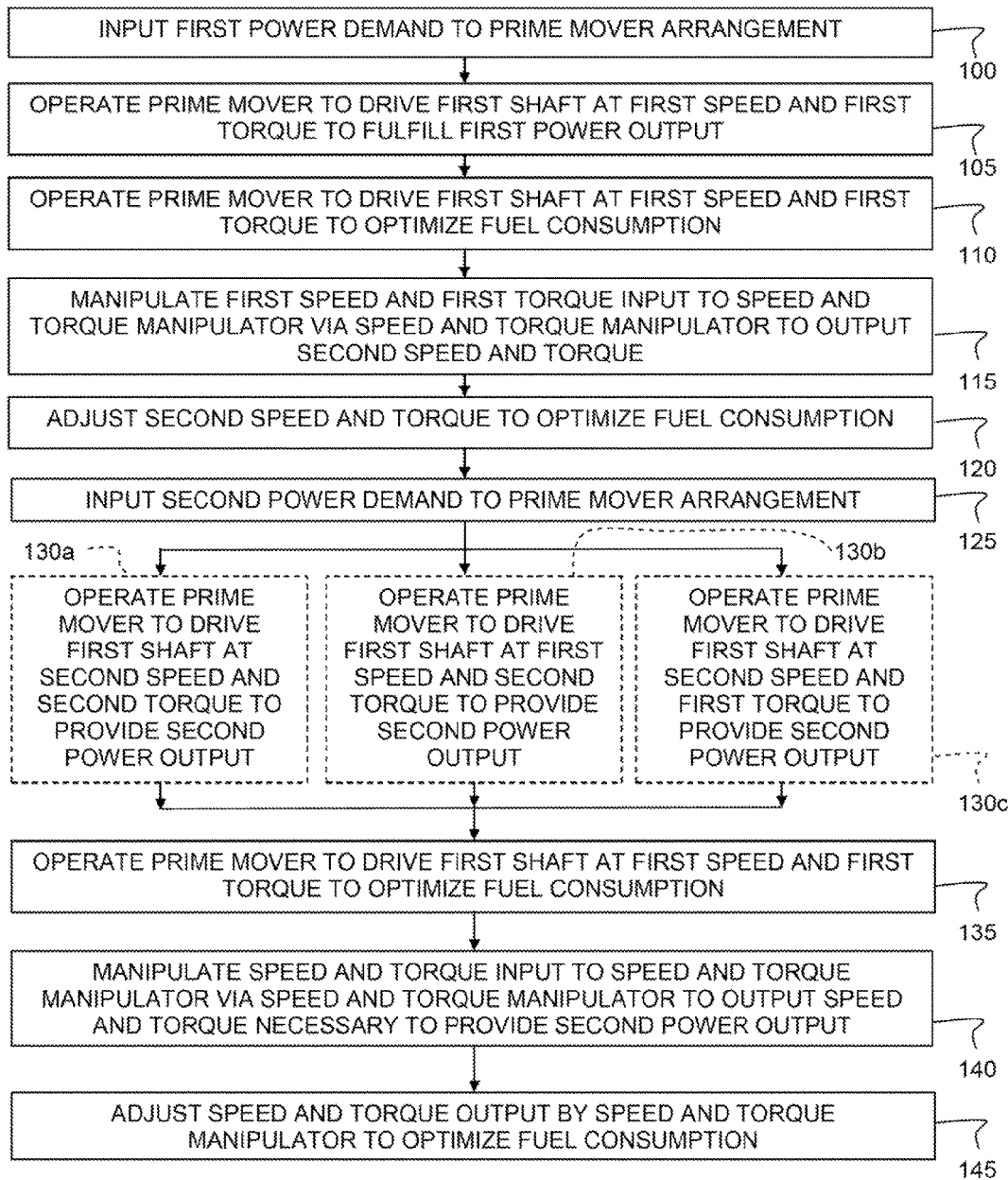
FIG. 2 is a flowchart showing steps of a method according to an aspect of the present invention.

Once the prime mover 23 has been adjusted to optimize fuel consumption at step 135 of FIG. 2, the speed and torque manipulator 29 can be controlled by the controller 33 to control the output speed and/or torque of the second shaft 27 to provide different output speeds and torques (SO1', TO1'; SO2', TO2'; SO3', TO3') as needed at step 140. The different output speeds and torques SO1', TO1'; SO2', TO2'; SO3', TO3' can be provided as at step 145 so that there is no adverse effect on the settings of the prime mover 23 that provide for optimal fuel consumption.

A non-transitory computer program product comprising computer code for controlling speed and torque output of the prime mover arrangement 21 can be provided to perform a method as described herein, such as by operating the prime mover so that the first shaft 25 is driven by the prime mover 23 at a first speed and at a first torque, driving the speed and torque manipulator 29 via the first shaft, driving the second shaft 27 via the speed and torque manipulator at a first output speed and first output torque at a first ratio relative to the first speed and the first torque, driving the second shaft via the speed and torque manipulator at a second output speed and second output torque at a second ratio relative to the first speed and the first torque, and driving the second shaft via the speed and torque manipulator at a third output speed and third output torque at a third ratio relative to the first speed and the first torque.

The prime mover arrangement according to aspects of the present invention can facilitate the use of different prime movers with different operating torques in connection with common or more standardized drivetrains. For example, if a prime mover is currently used with a particular drivetrain and it is desired to use a prime mover that operates at a lower speed and a higher mean operating torque, instead of redesigning the entire drivetrain, the speed and torque manipulator can reduce the mean operating torque output by the prime mover arrangement.

The prime mover arrangement according to aspects of the present invention can also facilitate changing the speed and torque delivered to a drivetrain without changing the operating conditions of the prime mover, which may be optimized for fuel consumption.

Figure 4:
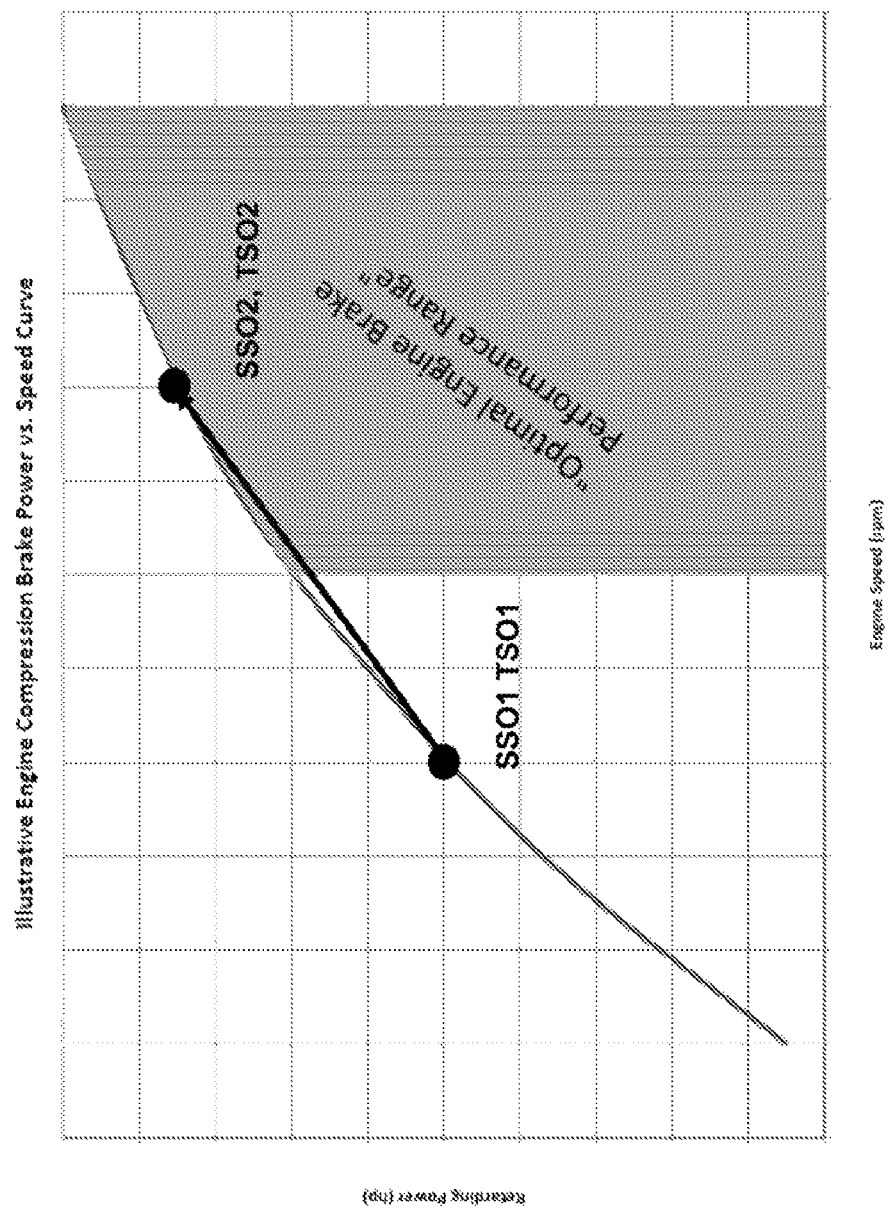
FIG. 4 is a graph of retarding power and engine speed for an illustrative internal combustion engine showing an optimal engine brake performance range.

The prime mover arrangement 21 may also or alternatively be operated in an engine braking mode wherein the second shaft 27 is driven at a first second mode speed and at a first second mode torque, and the speed and torque manipulator 29 is driven via the second shaft. To provide engine braking, the first shaft 25 and the prime mover 23 can be driven via the speed and torque manipulator 29 at, as seen in FIG. 4, a first second mode output speed SSO1 and first second mode output torque TSO1 at a first second mode ratio relative to the first second mode speed and the first second mode torque. To adjust an amount of engine braking provided, the first shaft 25 and the prime mover 23 can be driven via the speed and torque manipulator 29 at a second second mode output speed SSO2 and second second mode output torque TSO2 at a second second mode ratio relative to the first second mode speed and the first second mode torque. In this engine brake operating mode, the prime mover arrangement may be operated to, for example, adjust engine speed and/or retarding power to provide a desired retarding power and to move into what is, for the particular drivetrain an optimal engine brake performance range, as is illustrated in FIG. 4.

Similar to functioning as an engine brake, the prime mover arrangement 21 may also or alternatively be operated in a generator mode wherein the prime mover 23 functions as a generator that is driven by the first shaft 25, the second shaft 27 is adapted to be driven (by, e.g., wind, water, etc.), and the speed and torque manipulator 29 is connected to the first shaft and to the second shaft and permits manipulation between at least one non-one-to-one ratio or a plurality of different input/output ratios of speeds and torques input by the second shaft and output to the first shaft. For example, the first shaft 25 and the generator (prime mover 23) can be driven via the speed and torque manipulator 29 at a first output speed and first output torque at a first ratio relative to the first speed and the first torque at which the second shaft is driven, the subsequently driving the first shaft and the generator via the speed and torque manipulator at different second output speeds and second output torques at a second ratio relative to the first speed and the first torque. The first speed and first torque at which the second shaft 27 is driven can be sensed by speed and torque sensors (not shown). A non-transitory computer program product can be provided that comprises computer code for controlling speed and torque output of a generator arrangement. Upon registering (e.g., by sensors (not shown)) that the second shaft is being driven at a first speed and at a first torque, the program can perform a method wherein the first shaft and the generator can be driven via the speed and torque manipulator at a first output speed and first output torque at a first ratio relative to the first speed and the first torque at which the second shaft is driven, and subsequently driving the first shaft and the generator via the speed and torque manipulator at a second output speed and second output torque at a second ratio relative to the first speed and the first torque. The speed and torque input to the generator can be optimized to, e.g., facilitate generation of a maximum amount of power from the first speed and torque input via the second shaft, or to optimize for any number of other variables.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A prime mover arrangement and drivetrain, comprising:
    the prime mover arrangement disposed upstream from the drivetrain, the prime mover arrangement comprising
        a prime mover including a first shaft driven by the prime mover,
        a second shaft, the first and second shafts being non-coaxial, and
        a speed and torque manipulator connected to the first shaft and to the second shaft, the speed and torque manipulator permitting manipulation of at least one non-one-to-one ratio allowing speed and torque of the second shaft to be different than that of the prime mover; and
    the drivetrain comprising a flywheel forming at least part of the drivetrain, the flywheel being driven by the second shaft.

2. The prime mover arrangement and drivetrain as set forth in claim 1, wherein the speed and torque manipulator permits manipulation between a plurality of input/output ratios of speeds and torques input from the first shaft and output to the second shaft.

3. The prime mover arrangement and drivetrain as set forth in claim 1, wherein axes of the first shaft and the second shaft are offset from each other.

4. The prime mover arrangement and drivetrain as set forth in claim 1, wherein axes of the first shaft and the second shaft are non-parallel.

5. The prime mover arrangement and drivetrain as set forth in claim 1, wherein the speed and torque manipulator comprises one or more of a continuously variable transmission, a gear train, and a chain drive.

6. The prime mover arrangement and drivetrain as set forth in claim 1, wherein the speed and torque manipulator comprises at least a continuously variable transmission including one or more of a fluid coupling, a belt and pulley, and a rolling traction continuously variable transmission.

7. The prime mover arrangement and drivetrain as set forth in claim 1, wherein the speed and torque manipulator comprises at least a gear train comprising one or more of a single gear train, a layshaft gear train, and a planetary gear train.

8. The prime mover arrangement and drivetrain as set forth in claim 1, wherein the speed and torque manipulator comprises at least a chain drive comprising one or more of a multiple sprocket chain drive, and an expandable sprocket chain drive.

9. The prime mover arrangement and drivetrain as set forth in claim 1, comprising a controller configured to control the speed and torque manipulator to select an input/output ratio as a function of a power demand.

10. The prime mover arrangement and drivetrain as set forth in claim 9, comprising a controller configured to control the prime mover as a function of the power demand.

11. The prime mover arrangement and drivetrain as set forth in claim 9, wherein controller is configured to control the prime mover arrangement to perform an engine brake function and to select the input/output ratio as a function of engine brake demand.

12. The prime mover arrangement and drivetrain as set forth in claim 9, wherein the controller is configured to control the prime mover as a function of the power demand to minimize fuel consumption.

13. The prime mover arrangement and drivetrain as set forth in claim 1, wherein the prime mover arrangement is operable in a first mode to deliver power to the second shaft and in a second mode to receive power from the second shaft.

14. The prime mover arrangement and drivetrain as set forth in claim 1, wherein the drivetrain comprises a transmission.

15. A method for controlling speed and torque output of a prime mover arrangement and operating a drivetrain, the prime mover arrangement comprising a prime mover and a speed and torque manipulator, the prime mover arrangement being disposed upstream from the drivetrain, comprising:
    operating the prime mover so that a first shaft is driven by the prime mover at a first speed and at a first torque;
    driving the speed and torque manipulator via the first shaft;
    driving a second shaft via the speed and torque manipulator at a first output speed and first output torque at a first non-one-to-one ratio relative to the first speed and the first torque, the second shaft being non-coaxial with the first shaft; and
    driving a flywheel via the second shaft, the flywheel forming at least part of the drivetrain.

16. The method for controlling speed and torque output of the prime mover arrangement and operating the drivetrain as set forth in claim 15, comprising driving the second shaft via the speed and torque manipulator at a second output speed and second output torque at a second ratio relative to the first speed and the first torque.

17. The method for controlling speed and torque output of the prime mover arrangement and operating the drivetrain as set forth in claim 16, comprising inputting a power demand to a controller and outputting one or more control signals to the speed and torque manipulator to select one of the first or second ratios as a function of the power demand.

18. The method for controlling speed and torque output of the prime, mover arrangement and operating the drivetrain as set forth in claim 16, wherein the speed and torque manipulator is adapted to change a ratio of the first speed and first toque of the first shaft input to the speed and torque manipulator to an output speed and output torque of the second shaft driven by the speed and torque manipulator at a plurality of ratios between a maximum ratio and a minimum ratio, comprising driving the second shaft at an output speed and output torque at any ratio, relative to the first speed and first torque, between the maximum ratio and the minimum ratio via the speed and torque manipulator.

19. The method for controlling speed and torque output of the prime mover arrangement and operating the drivetrain as set forth in claim 18, comprising inputting a power demand to a controller and outputting one or more control signals to the speed and torque manipulator to select a ratio between the maximum ratio and the minimum ratio as a function of the power demand.

20. The method for controlling speed and torque output of the prime mover arrangement and operating the drivetrain as set forth in claim 19, comprising controlling the prime mover as a function of the power demand to optimize fuel consumption.

21. The method for controlling speed and torque output of the prime mover arrangement and operating the drivetrain as set forth in claim 20, comprising outputting one or more control signals to control the speed and torque manipulator to provide an output speed and torque at the second shaft different than the first speed and first torque of the first shaft.

22. The method for controlling speed and torque output of the prime mover arrangement and operating the drivetrain as set forth in claim 21, comprising optimizing fuel consumption by controlling both the prime mover and the speed and torque manipulator to control the output speed and torque.

23. The method for controlling speed and torque output of the prime mover arrangement and operating the drivetrain as set forth in claim 16, comprising operating the prime mover arrangement in a second mode, including:
    driving the second shaft at a first second mode speed and at a first second mode torque;
    driving the speed and torque manipulator via the second shaft;
    driving the first shaft and the prime mover via the speed and torque manipulator at a first second mode output speed and first second mode output torque at a first second mode ratio relative to the first second mode speed and the first second mode torque; and
    driving the first shaft and the prime mover via the speed and torque manipulator at a second second mode output speed and second second mode output torque at a second second mode ratio relative to the first second mode speed and the first second mode torque.

24. The method for controlling speed and torque output of the prime mover arrangement and operating the drivetrain as set forth in claim 16, comprising operating the prime mover arrangement in a first mode to deliver power to the second shaft and in a second mode to receive power from the second shaft.

25. The method for controlling speed and torque output of the prime mover arrangement and operating the drivetrain as set forth in claim 15, wherein the drivetrain comprises a transmission.

26. A non-transitory computer program product comprising computer code for controlling speed and torque output of a prime mover arrangement and operating a drivetrain, the prime mover arrangement comprising a prime mover and a speed and torque manipulator, the prime mover arrangement being disposed upstream from the drivetrain, to perform a method comprising:
    operating the prime mover so that a first shaft is driven by the prime mover at a first speed and at a first torque;
    driving a speed and torque manipulator via the first shaft;
    driving a second shaft via the speed and torque manipulator at a first output speed and first output torque at a first ratio relative to the first speed and the first torque, the second shaft being non-coaxial with the first shaft;
    driving the second shaft via the speed and torque manipulator at a second output speed and second output torque at a second ratio relative to the first speed and the first torque; and
    driving the second shaft via the speed and torque manipulator at a third output speed and third output torque at a third ratio relative to the first speed and the first torque; and
    driving a flywheel via the second shaft, the flywheel forming at least part of the drivetrain.

27. The non-transitory computer program product as set forth in claim 26, wherein wherein the drivetrain comprises a transmission.

28. A prime mover arrangement and drivetrain, comprising:
    the prime mover arrangement disposed upstream from the drivetrain, the prime mover arrangement comprising
        a prime mover including a first shaft driven by the prime mover,
        a second shaft, and
        a speed and torque manipulator connected to the first shaft and to the second shaft, the speed and torque manipulator permitting manipulation between at least three different input/output ratios of speeds and torques input by the first shaft and output to the second shaft; and
    a flywheel forming at least part of the drivetrain, the flywheel being driven by the second shaft.

29. The mime mover arrangement and drivetrain as set forth in claim 28, wherein the drivetrain comprises a transmission.

30. A method for controlling speed and torque output of a prime mover arrangement and operating a drivetrain, the prime mover arrangement comprising a prime mover and a speed and torque manipulator, the prime mover arrangement being disposed upstream from the drivetrain, comprising:
    operating the prime mover so that a first shaft is driven by the prime mover at a first speed and at a first torque;
    driving the speed and torque manipulator via the first shaft;
    driving a second shaft via the speed and torque manipulator at a first output speed and first output torque at a first ratio relative to the first speed and the first torque;
    driving the second shaft via the speed and torque manipulator at a second output speed and second output torque at a second ratio relative to the first speed and the first torque;
    driving the second shaft via the speed and torque manipulator at a third output speed and third output torque at a third ratio relative to the first speed and the first torque; and
    driving a flywheel via the second shaft, the flywheel forming at least part of the drivetrain.

31. The method for controlling speed and torque output of the prime mover arrangement and operating the drivetrain as set forth in claim 30, wherein the drivetrain comprises a transmission.

32. A non-transitory computer program product comprising computer code for controlling speed and torque output of a prime mover arrangement and operating a drivetrain, the prime mover arrangement comprising a prime mover and a speed and torque manipulator, the prime mover arrangement being disposed upstream from the drivetrain, to perform a method comprising:
operating the prime mover so that a first shaft is driven by the prime mover at a first speed and at a first torque;
driving a speed and torque manipulator via the first shaft;
driving a second shaft via the speed and torque manipulator at a first output speed and first output torque at a first ratio relative to the first speed and the first torque;
driving the second shaft via the speed and torque manipulator at a second output speed and second output torque at a second ratio relative to the first speed and the first torque; and
driving the second shaft via the speed and torque manipulator at a third output speed and third output torque at a third ratio relative to the first speed and the first torque; and
driving a flywheel via the second shaft, the flywheel forming at least part of the drivetrain.

33. The non-transitory computer program product as set forth in claim 32, wherein the drivetrain comprises a transmission.

34. A generator arrangement and drivetrain, comprising:
the generator arrangement disposed upstream from the drivetrain, the generator arrangement comprising
a generator including a first shaft arranged to drive the generator,
a second shaft adapted to be driven, and
a speed and torque manipulator connected to the first shaft and to the second shaft, the speed and torque manipulator permitting manipulation between a plurality of different input/output ratios of speeds and torques input by the second shaft and output to the first shaft; and
the drivetrain comprising a flywheel forming at least part of the drivetrain, the flywheel being driven by the second shaft.

35. The generator arrangement and drivetrain as set forth in claim 34, wherein the drivetrain comprises a transmission.

36. A method for controlling speed and torque output of a generator arrangement and operating a drivetrain, the generator arrangement being disposed upstream from the drivetrain, the generator arrangement comprising a generator connected to a speed and torque manipulator via a first shaft, and a second shaft that is adapted to be driven to input power to the speed and torque manipulator, comprising:
driving the second shaft at a first speed and at a first torque;
driving the speed and torque manipulator via the second shaft;
driving the first shaft and the generator via the speed and torque manipulator at a first output speed and first output torque at a first ratio relative to the first speed and the first torque;
driving the first shaft and the generator via the speed and torque manipulator at a second output speed and second output torque at a second ratio relative to the first speed and the first torque; and
driving a flywheel via the second shaft, the flywheel forming at least part of the drivetrain.

37. The method for controlling speed and torque output of the generator arrangement and operating a drivetrain as set forth in claim 36, wherein the drivetrain comprises a transmission.

38. A non-transitory computer program product comprising computer code for controlling speed and torque output of a generator arrangement and operating a drivetrain according to a method, the generator arrangement being disposed upstream from the drivetrain, the generator arrangement comprising a generator connected to a speed and torque manipulator via a first shaft, and a second shaft that is adapted to be driven to input power to the speed and torque manipulator, the method comprising:
registering that the second shaft is being driven at a first speed and at a first torque;
driving the speed and torque manipulator via the second shaft;
driving the first shaft and the generator via the speed and torque manipulator at a first output speed and first output torque at a first ratio relative to the first speed and the first torque;
driving the first shaft and the generator via the speed and torque manipulator at a second output speed and second output torque at a second ratio relative to the first speed and the first torque; and
driving a flywheel via the second shaft, the flywheel forming at least part of the drivetrain.

39. The non-transitory computer program product as set forth in claim 38, wherein the drivetrain comprises a transmission.

* * * * *